US011976982B2

(12) United States Patent
Fokine

(10) Patent No.: US 11,976,982 B2
(45) Date of Patent: May 7, 2024

(54) METHOD AND APPARATUS FOR TEMPERATURE MEASUREMENT IN OPTICAL FIBER FUSION SPLICING

(71) Applicant: NorthLab Photonics AB, Nacka (SE)

(72) Inventor: Michael Fokine, Saltsjo-Boo (SE)

(73) Assignee: NorthLab Photonics AB, Nacka (SE)

( * ) Notice: Subject to any disclaimer, the term of this patent is extended or adjusted under 35 U.S.C. 154(b) by 413 days.

(21) Appl. No.: 17/292,422

(22) PCT Filed: Nov. 8, 2019

(86) PCT No.: PCT/SE2019/051133
§ 371 (c)(1),
(2) Date: May 7, 2021

(87) PCT Pub. No.: WO2020/101555
PCT Pub. Date: May 22, 2020

(65) Prior Publication Data
US 2022/0011175 A1 Jan. 13, 2022

(30) Foreign Application Priority Data
Nov. 13, 2018 (SE) .................... 1851411-7

(51) Int. Cl.
*G01K 11/32* (2021.01)
*G01D 5/353* (2006.01)
(Continued)

(52) U.S. Cl.
CPC ......... *G01K 11/32* (2013.01); *G01D 5/35306* (2013.01); *G01M 11/35* (2013.01); *G02B 6/2551* (2013.01)

(58) Field of Classification Search
CPC .... G02B 6/255; G02B 6/2551; G02B 6/2552; G02B 6/2553; G01K 11/32; G01N 21/412; G01M 11/35
See application file for complete search history.

(56) References Cited

U.S. PATENT DOCUMENTS 3,982,816 A * 9/1976 Watkins ................. G01M 11/37
356/73.1
5,381,229 A * 1/1995 Murphy ............. G01K 11/3206
374/161
5,772,327 A 6/1998 Zheng
(Continued)

FOREIGN PATENT DOCUMENTS

CN 105115623 B 12/2017
JP 60-79237 A * 5/1985
(Continued)

OTHER PUBLICATIONS

T. Hu et al. Miniaturized fiber in-line Mach-Zehnder interferometer based on inner air cavity for high-temperature sensing. Optics Letters, 37:34:5082-5084, Dec. 15, 2012. (https://doi.org/10.1364/OL.37.005082) (Year: 2012).*
(Continued)

*Primary Examiner* — Michael Stahl
(74) *Attorney, Agent, or Firm* — Patterson + Sheridan, LLP

(57) ABSTRACT

The present invention relates to a method and an apparatus for measuring the temperature of optical fibers during fusion splicing or thermal processing, said method comprising: a) measuring, using an interferometric method, a change in an optical path length in an optical fiber due to temperature dependent properties of the optical fiber during fusion
(Continued)

splicing or thermal processing; and b) determining the temperature of the optical fiber based on the measured changes in the optical path length.

15 Claims, 6 Drawing Sheets

(51) Int. Cl.
  *G01M 11/00* (2006.01)
  *G02B 6/255* (2006.01)

(56) References Cited

U.S. PATENT DOCUMENTS

| | | | |
|---|---|---|---|
| 2006/0074516 A1 | 4/2006 | Huang | |
| 2009/0129731 A1* | 5/2009 | Contag | G02B 6/2551 385/96 |
| 2011/0102803 A1* | 5/2011 | Wang | G01B 9/02024 374/161 |
| 2014/0363118 A1* | 12/2014 | Wang | G01K 11/32 385/12 |

FOREIGN PATENT DOCUMENTS

| | | |
|---|---|---|
| JP | 2002277671 A | 9/2002 |
| WO | WO 84/04158 A1 * | 10/1984 |
| WO | 2017183321 A1 | 10/2017 |

OTHER PUBLICATIONS

A. Wang et al. Sapphire-fiber-based intrinsic Fabry-Perot interferometer. Optics Letters, 17:14:1021-1023, Jul. 15, 1992. (https://doi.org/10.1364/OL.17.001021) (Year: 1992).*

C. Harvey et al. Mach-Zehnder interferometer for in-situ non-contact temperature monitoring during thermal processing of an optical fibre. Journal of Lightwave Technology, 39:22:7223-7230, Nov. 15, 2021. (Year: 2021).*

International Search Report and Written Opinion from PCT/SE2019/051133 dated Dec. 12, 2019.

Supplementary European Search Report for EP 19883428 dated Jul. 6, 2022 (2 pages).

* cited by examiner

METHOD AND APPARATUS FOR TEMPERATURE MEASUREMENT IN OPTICAL FIBER FUSION SPLICING

TECHNICAL FIELD

The present disclosure relates generally to methods and devices for fusion splicing of optical fibers and more particularly to methods and devices for measuring the temperature of the optical fiber during fusion splicing.

BACKGROUND

Fusion splicing refers to the process of fusing or welding two optical fibers together using heat. The source of heat is usually an electric arc, but can also be a laser, a gas flame, or a tungsten filament through which current is passed. It is well known that fusion temperature in a splicer will vary due to significant changes of operating environment, e.g. changes of altitude, temperature and humidity etc. For the well-defined operating environment, the fusion temperature can still be varied because of changes in electrode conditions, e.g. wear of the electrodes and dynamic changes of silica layers deposited on the electrodes. During high temperature fusion splicing (the temperature of the material of the fiber ends is about 1800° C.-2000° C. and the temperature in the arc region surrounding the fiber ends is about 3000° C.-4000° C.), particles from the silica material of the fibers are evaporated and plated on the surface of the electrodes, giving the surface a rather rough structure. Even for the same settings of fusion parameters (e.g. fusion currents and fusion time etc.), finite tolerance in manufacture processes of splicers may also result in different fusion temperature among identical type of splicers. As a consequence of fusion temperature variation, inconsistent splicing results (e.g. in term of splice losses, splice strength and loss estimation etc.) will occur in a particular splicer and/or among identical splicers.

During past decades, many scientists have devoted their efforts to study and model the impacts of different factors in splicing processes, e.g. the operating environment, the electrode conditions and the machinery tolerances etc. Up to the date, suitable models have not been seen for commercial splicers, which could be attributed to primarily technical reasons and rather complicated nature of the involved splicing processes. Thus, instead of modeling individual factors, different calibrating processes for deriving the integrated effect of these factors have been proposed and developed, which involve directly or indirectly measuring discharge heat energy and/or fusion temperature. That is the so-called arc-test or the arc-check process.

One method frequently referred to is the fiber-meltback method described in Japanese patent application JP5150132 and in U.S. Pat. No. 5,009,513. With this method, the fiber ends are positioned with a known gap distance and then heated by the electrical arc. The heating process causes a retraction of fiber ends and results in an increase of gap distance. By measuring the amount of change in the gap distance, the discharge heat energy can be determined. Unfortunately, it is found that, the retraction of fiber ends is strongly affected by the degree of arc-spread (e.g. changes in the effective width of arc intensity profile). The method therefore does not give the high accuracy of calibration.

Another type of methods are the offset-splicing methods described in, e.g., U.S. Pat. Nos. 5,772,327, 4,948,412 and 6,294,760. With these methods, two fibers are spliced with an initial core/cladding axial offset. Due to surface tension effects, a reduction of the axial offset will occur during splicing processes. By measuring the relative reduction of the offset, the discharge heat energy is determined. Though the methods are less sensitive to the degree of arc-spread, the process could be however strongly affected by the "arc-walk", i.e. the spatial movement of arc intensity profile due to dynamic changes of silica layers deposited on the electrodes. The arc-walk changes the amount of energy deposited on the offset-splicing point, which in turn results in the inconsistent results from one calibration to the other.

Other methods, such as the barometric sensor method (EP583155 and EP504519) and the method of electrode-impedance-detection (JP9005559), rely mainly on the hardware construction in the splicer. Thus, these methods are not applicable to compensate differences in fusion currents among identical splicers due to finite tolerances of hardware components. And, the reliability of these methods may also suffer from those components having high sensitivity to operating environment.

Accordingly, there still remains a demand in the field for improved methods for measuring and controlling the fusion temperature in optical fiber splicing devices.

SUMMARY OF THE INVENTION

The present invention relates generally to the problem of how to provide high reliability and high accuracy of fusion temperature measurement in an optical fiber splicing device, without the drawbacks connected with existing techniques, such as drift and errors introduced through changes in environmental factors such as air temperature and humidity.

It is an object of the invention to provide a method for measuring temperature which can be used as part of an automatic method for regulation of the fusion temperature when welding optical fibers and which can performed in real time.

It is another object of the invention to provide devices for measuring temperature, in particular a fusion splicing apparatus for optical fibers having a good temperature control.

The term "fusion splicing", as used herein, refers to the process of fusing or welding two optical fibers together using heat. The source of heat is usually an electric arc, but can also be a laser, a gas flame, or a tungsten filament through which current is passed. Fusion splicing is the most widely used method of splicing as it provides for the lowest loss and least reflectance, as well as providing the strongest and most reliable joint between two fibers.

The term "fusion splicer" or "fusion splicing apparatus", as used herein, refers to a device that uses heat to melt two optical fibers together at their end faces, to form a single long fiber. The resulting joint, or fusion splice, permanently joins the two glass fibers end to end, so that optical light signals can pass from one fiber into the other with very little loss.

The term "optical fiber", as used herein, generally refers to crystal or glass based optical fibers for optical and photonic applications.

The term "optical microcavity", as used herein, generally refers to a structure formed by reflecting faces on the two sides of a spacer layer or optical medium. The optical microcavity may preferably be a transparent or semi-transparent object having circular or concentric symmetry in the form of cylindrical or spherical shape, such as a fiber or microsphere.

The term "optical microcavity interferometer", as used herein, refers to an interferometer configured to measure a change in an optical path length in an optical microcavity.

Specifically, the technology is applicable to objects forming an optical microcavity having circular symmetry in the form of cylindrical or spherical shape, e.g. fibers or microspheres. Preferred diameters of objects to measure are on the order of a few micrometers or larger. However, interferometric measurements on objects with a diameter of 100 mm have also been demonstrated.

The microcavity interferometer used herein is based on the same principles as traditional interferometers, such as the Fabry-Perot or Mach-Zehnder type interferometer. Generally, the microcavity interferometer consists of the optical microcavity (i.e. the optical fiber being spliced), a light source (e.g. a laser), optical components (e.g. mirrors, lenses, beam splitters and polarization optics), detector components (e.g. homodyne detection, heterodyne detection, spectral detection, or imaging/fringe analysis), and equipment for processing, presenting, and/or storing the data/results obtained from the measurement.

Temperature measurements are performed by interferometrically measuring changes of the optical path length (OPL) of light interacting with the sample. Changes in OPL are caused primarily by geometrical changes due to thermal expansion of the material, and to changes in the refractive index due to thermo-optic properties of the material.

The above mentioned objects, as well as other objects as will be realized by the skilled person in the light of the present disclosure are achieved by the various aspects of the present disclosure.

According to a first aspect illustrated herein, there is provided a method for measuring the temperature of optical fibers during fusion splicing or thermal processing, said method comprising:
 a) measuring, using an interferometric method, a change in an optical path length in an optical fiber due to temperature dependent properties of the optical fiber during fusion splicing or thermal processing; and
 b) determining the temperature of the optical fiber based on the measured changes in the optical path length.

In other words, the invention concerns a method and device for performing temperature measurements of an optical fiber during splicing, using an interferometric technique where the optical fiber having a circular cross section itself serves as the optical microcavity. The invention uses the optical fiber diameter combined with known properties of the optical fiber material that are dependent on temperature, namely thermal expansion and changes in refractive index to determine the optical path length. A change in optical path length of light interacting with the optical fiber can then be used to determine a temperature of the fiber with great accuracy. Temperature is extracted by analyzing the phase/intensity of the interfering beams.

The material/device itself forms the interferometric cavity, with its surface acting as partially reflecting mirrors, due to Fresnel reflection. Since the material/device to be analyzed forms the interferometric cavity (microcavity) it is inherently insensitive to external perturbations, such as changes in temperature or humidity of the surrounding media (e.g. air).

An important advantage of the invention is thus the ability to determine a temperature in an accurate and more robust way, without disadvantages otherwise connected with measuring devices such as drift and errors introduced through changes in environmental factors such as air temperature and humidity. Thanks to the invention, a higher degree of process control during splicing of optical fibers can be achieved, thereby also giving a higher reproducibility, enabling controlled and/or constant temperature during splicing and allowing control of the process through a constant feedback. As a result, the spliced fibers will be of higher quality.

In some embodiments the optical fiber is made of a material selected from the group consisting of silica-based glass, telluride glass, chalcogenide glass, fluoride glass, sapphire crystal, quartz crystal, and crystalline silicon.

The invention uses known properties of the optical fiber material that are dependent on temperature. In some embodiments the temperature dependent properties of the optical fiber are selected from the group consisting of thermal expansion and refractive index.

The inventive method can be used to measure temperature with high accuracy within a wide temperature range. The non-contact interferometric technique allows for maximum temperatures well in excess of 2000° C., and even above 3000° C., to be measured. Thus, in some embodiments the top temperature measured is in the range of from 300° C. to 3000° C., preferably in the range of from 1000° C. to 3000° C.

Fused silica is considered a "strong" glass, in the sense that it has a viscosity that changes gradually over a wide temperature range. However, it has also been found that the inventive method is useful for fusion splicing of certain "fragile" glasses having a relatively narrow glass transition temperature range. Such fragile glasses may display a rapid change in viscosity as the temperature is increased near the glass transition temperature. Fusion splicing fibers of fragile glass, such as fluoride glass (e.g. ZBLAN) or chalcogenides, is consequently much more difficult due to the sensitivity to small temperature variations. Therefore, in some embodiments the top temperature measured is only in the range of from 100° C. to 1000° C., and preferably in the range of from 100° C. to 300° C.

In other words, the inventive method is of particular use in high temperature applications, e.g. fusion splicing of silica based optical fibers with temperatures exceeding 1000° C. or even 2000° C., but it has also proven highly useful in the fusion splicing of "fragile" glasses at lower splicing temperatures such as below 1000° C. or even below 300° C.

The microcavity interferometer used herein is based on the same principles as traditional interferometers, such as the Fabry-Perot or Mach-Zehnder type interferometer. In some embodiments the interferometric method comprises measuring the change in an optical path length using a Fabry-Perot or Mach-Zehnder type interferometer. However, the skilled person readily realizes that other interferometric setups may also be used. Examples of other interferometric setups that could be used include, but are not limited to Rainbow Refraction, Interferometric Mie Imaging, and Time resolved Mie scattering.

Often optical fiber splice programs/protocols for specific fibers have been developed by trial-and-error testing, not from accurate knowledge of temperature or material properties. Fusion splicer electrodes degrade over time. Fusion splicing can also be sensitive to ambient temperature and humidity affecting the quality of the splice. The presented technique enables in-situ monitoring of the temperature enabling direct measurements of any changes or degradation during splicing.

The temperature measurements can also be used as feedback to the splicer in order to enable controllable or constant temperature during splicing. I.e. a measurement indicating that the temperature is too high can prompt a reduction in the electric (welding) current, leading to a reduction of the temperature, and vice versa. This way, the temperature can be maintained within a predetermined temperature range. Thus, in some embodiments, the method further comprises the step:

c) using the temperature determined in step b) as feedback during splicing to enable controllable temperature.

Furthermore, the invention can be used after a splicing has taken place to analyze the optical fiber and thereby determine the quality of the splice. In some embodiments, the method further comprises the step:

d) analyzing the optical fiber after fusion splicing using an interferometric method to determine quality of the splice through detection of variations in diameter or refractive index of the optical fiber.

In some embodiments the temperature measurement is not sensitive to changes in temperature and humidity in the atmosphere surrounding the optical fiber.

According to a second aspect illustrated herein, there is provided a fusion splicing apparatus for fusing or welding optical fibers together, said apparatus comprising means for measuring the temperature of the optical fibers during fusion splicing or thermal processing, wherein said means comprise an optical microcavity interferometer configured to measure a change in an optical path length in an optical microcavity due to temperature dependent properties of the optical microcavity, and wherein said optical microcavity interferometer is arranged to use an optical fiber being subjected to fusion splicing or thermal processing in the fusion splicing apparatus as the optical microcavity.

The microcavity interferometer used herein is based on the same principles as traditional interferometers, such as the Fabry-Perot or Mach-Zehnder type interferometer. In some embodiments the optical microcavity interferometer is a Fabry-Perot or Mach-Zehnder type microcavity interferometer. However, the skilled person readily realizes that other interferometric setups may also be used. Examples of other interferometric setups that could be used include, but are not limited to Rainbow Refraction, Interferometric Mie Imaging, and Time resolved Mie scattering.

The temperature measurements can also be used as feedback to the splicer in order to enable controllable or constant temperature during splicing. I.e. a measurement indicating that the temperature is too high can prompt a reduction in the welding current, leading to a reduction of the temperature, and vice versa. This way, the temperature can be maintained within a predetermined temperature range. Thus, in some embodiments the fusion splicing apparatus is configured to use the measured temperature as feedback during splicing to enable controllable temperature.

The interferometer of the fusion splicing apparatus may advantageously also be used for analyzing the optical fiber after fusion splicing using an interferometric method to determine quality of the splice through detection of variations in diameter or refractive index of the optical fiber. Thus, in some embodiments the fusion splicing apparatus is further configured to use the microcavity interferometer for analyzing the optical fiber after fusion splicing using an interferometric method to determine quality of the splice through detection of variations in diameter or refractive index of the optical fiber.

According to a third aspect illustrated herein, there is provided the use of an optical fiber as the optical microcavity in an optical microcavity interferometer for measuring the temperature of the optical fiber during fusion splicing or thermal processing of the optical fiber.

BRIEF DESCRIPTION OF THE DRAWINGS

Referring now to the drawings, which are exemplary embodiments, and wherein.

DETAILED DESCRIPTION OF PREFERRED EMBODIMENTS

Figure 1A:
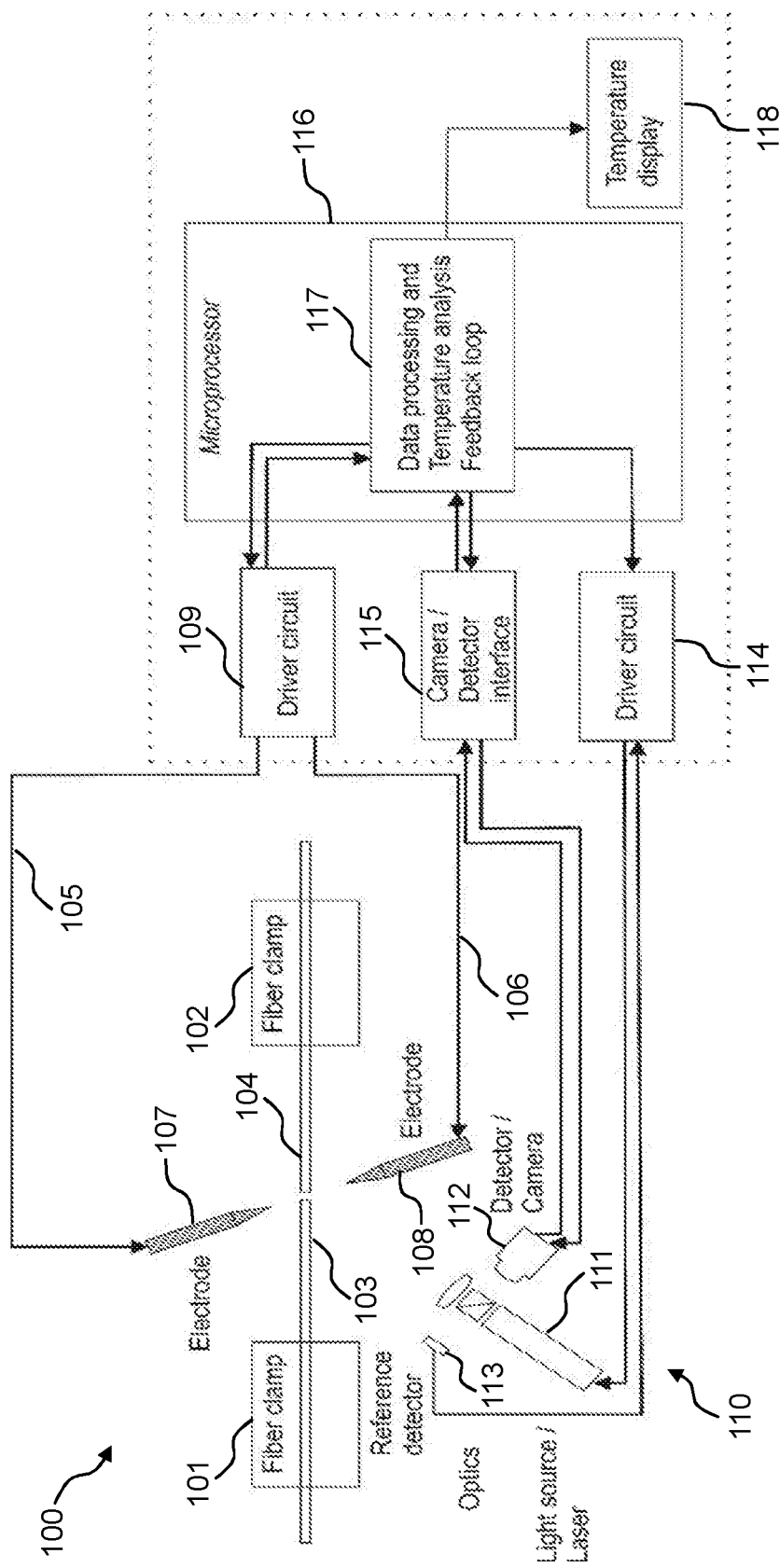
FIG. 1a is a schematic view of a fusion splicing apparatus according to the invention comprising a Fabry Perot type microcavity interferometer.

The correlation between temperature and measured changes in an optical path length in an optical fiber due to temperature dependent properties of the optical fiber during fusion splicing or thermal processing can be used in an optical fiber fusion splicing apparatus of the automatic type, which is schematically shown in FIG. 1a. The apparatus (100) has clamps (101,102), in which end portions of optical fibers (103,104) are placed and retained as their position is adjusted in the welding process. The clamps are displaceable in a direction parallel to the longitudinal direction of the fibers. Possibly, the clamps can also be displaceable in directions perpendicular to the fiber longitudinal direction in order to align the fibers with each other. Generally, however this alignment is produced by placing the fiber ends in V-grooves or similar fixed mechanical guides. The clamps are operated along suitable mechanical guides by means of control motors (not shown). Electrical lines (105,106) to electrodes (107,108) extend from a driver circuit (109).

The apparatus (100) further includes a Fabry Perot type microcavity interferometer (110). The interferometer (110) is comprised of a light source (111), a detector (112), a reference detector (113) and suitable optical components. The Fabry Perot type microcavity interferometer (110) is described more in detail with reference to FIGS. 2a and 2b. The light source (111) is connected to a driver circuit (114) and the detector (112) is connected to a detector interface (115).

Figure 1B:
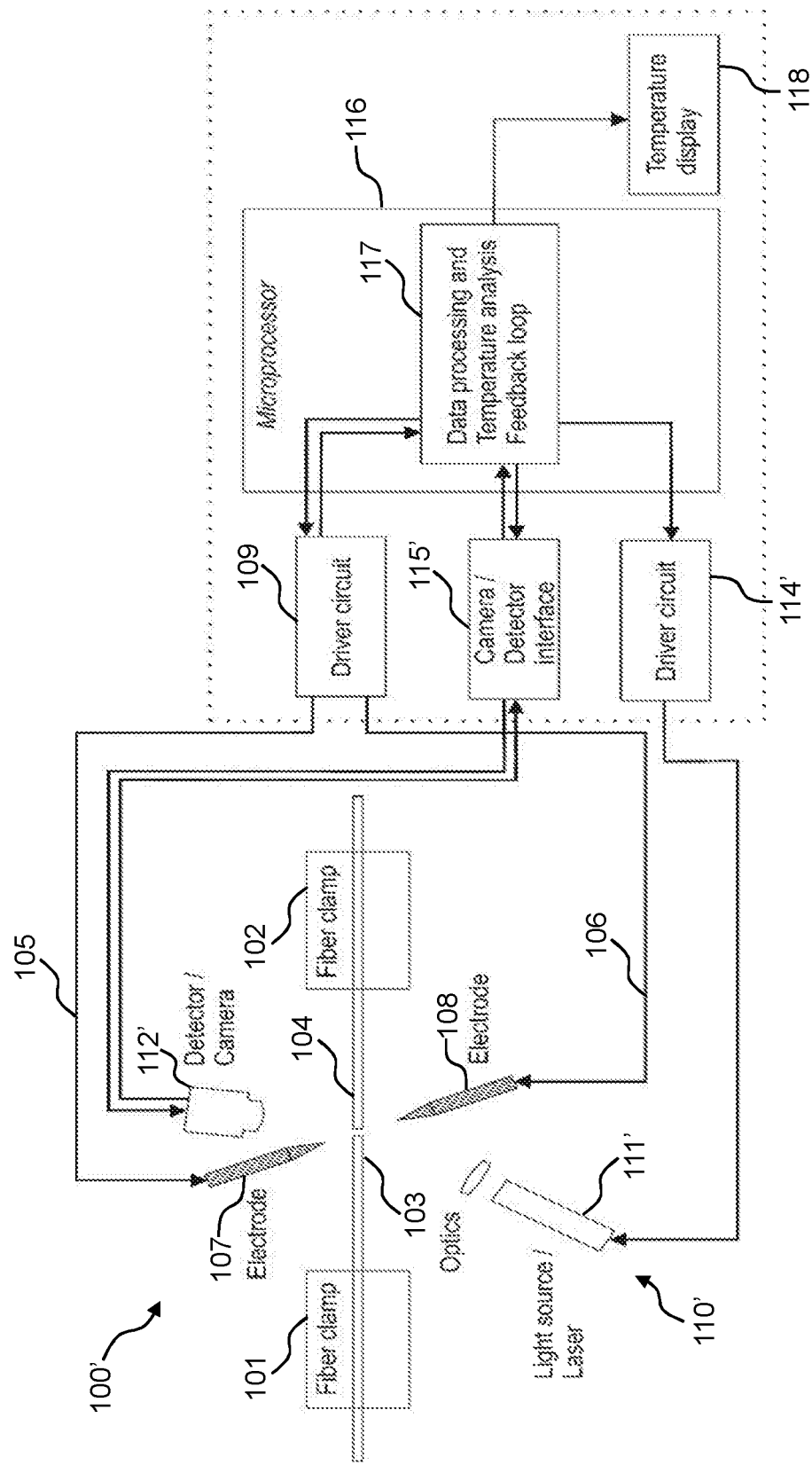
FIG. 1b is a schematic view of a fusion splicing apparatus according to the invention comprising a Mach Zehnder type microcavity interferometer.

The apparatus (100') of FIG. 1b is identical to the apparatus of FIG. 1a, with the exception that the interferometer (110') is of the Mach Zehnder type. The interferometer (110') is comprised of a light source (111'), a detector (112') and suitable optical components. The Mach Zehnder type microcavity interferometer (110') is described more in detail with reference to FIGS. 3a and 3b. The light source (111') is connected to a driver circuit (114') and the detector (112') is connected to a detector interface (115').

The electrode and light source driver circuits (109,110, 110'), and the detector interface (115,115'), are connected to a control unit (116), specifically a microprocessor. In particular, a signal from the detector (112,112') is provided to a data processing and temperature analysis feedback loop (117) of the control unit (116). The data processing and temperature analysis feedback loop (117) analyses the detector signal in order to determine among other things the temperature of the optical fiber. The data processing and temperature analysis feedback loop (117) uses values provided by the user, including the optical fiber diameter as well as inherent temperature dependent properties of the material of the optical fiber being processed, specifically thermal expansion and refractive index, to determine the optical path length. A change in optical path length of light interacting with the optical fiber can then be used to determine a temperature of the fiber with great accuracy. Temperature is extracted by analyzing the phase/intensity of the interfering beams.

The data processing and temperature analysis feedback loop (117) may further compare the determined temperature to different set values stored in a memory (not shown).

The temperature, as well as other parameters determined by the temperature analysis feedback loop (117) can be displayed on a monitor (118).

The different steps in the procedure are controlled by the control unit (116). The microprocessor further controls the displacement of the fiber ends (103,104) in relation to each other via the motors, and the time, when a heating of the fiber ends is to be made, via the driver circuit (109) to provide the welding electrodes (107,108) with an electric voltage, so that a suitable electrode current flows between the electrodes (107,108), and it also controls those time periods, during which different electrode currents are to be supplied.

The automated splicing process will typically include a series of steps. A prefuse cycle is used to remove any dirt on the fiber ends and preheat the fibers for splicing. The fibers (103,104) are aligned using the clamps (101,102), mechanical guides and control motors. The fibers are fused by an automatic arc cycle that heats them in an electric arc and feeds the fibers together at a controlled rate. When fusion is completed, the splice is inspected to estimate the optical loss of the splice.

During all these time periods also the temperature can be automatically analyzed by the interferometer (110,110') and data processing and temperature analysis feedback loop (117) of the control unit (116). The data processing and temperature analysis feedback loop (117) uses values provided by the user, including the optical fiber diameter as well as inherent temperature dependent properties of the material of the optical fiber being processed, specifically thermal expansion and refractive index, to determine the optical path length. A change in optical path length of light interacting with the optical fiber can then be used to determine a temperature of the fiber with great accuracy. Temperature is extracted by analyzing the phase/intensity of the interfering beams.

Figure 2A:
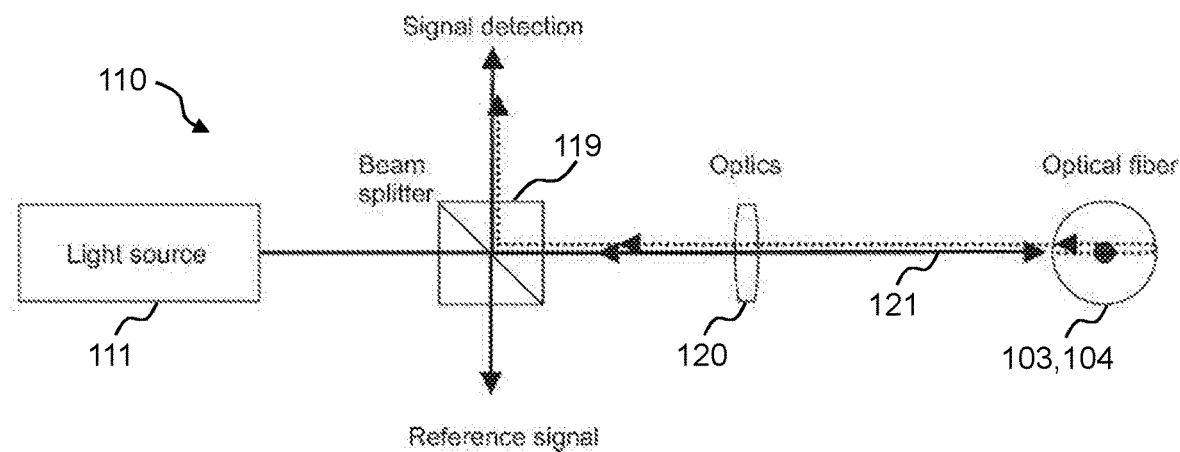
FIG. 2a is a schematic view of a Fabry Perot type microcavity interferometer.
Figure 2B:
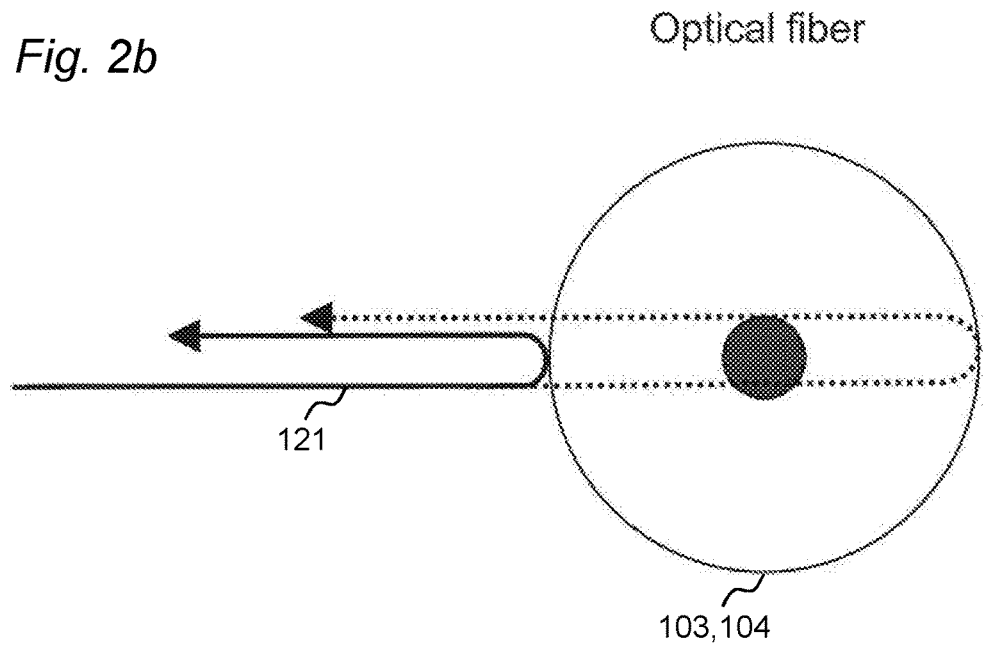
FIG. 2b is a schematic view of the optical path in a Fabry Perot type microcavity interferometer.
Figure 3A:
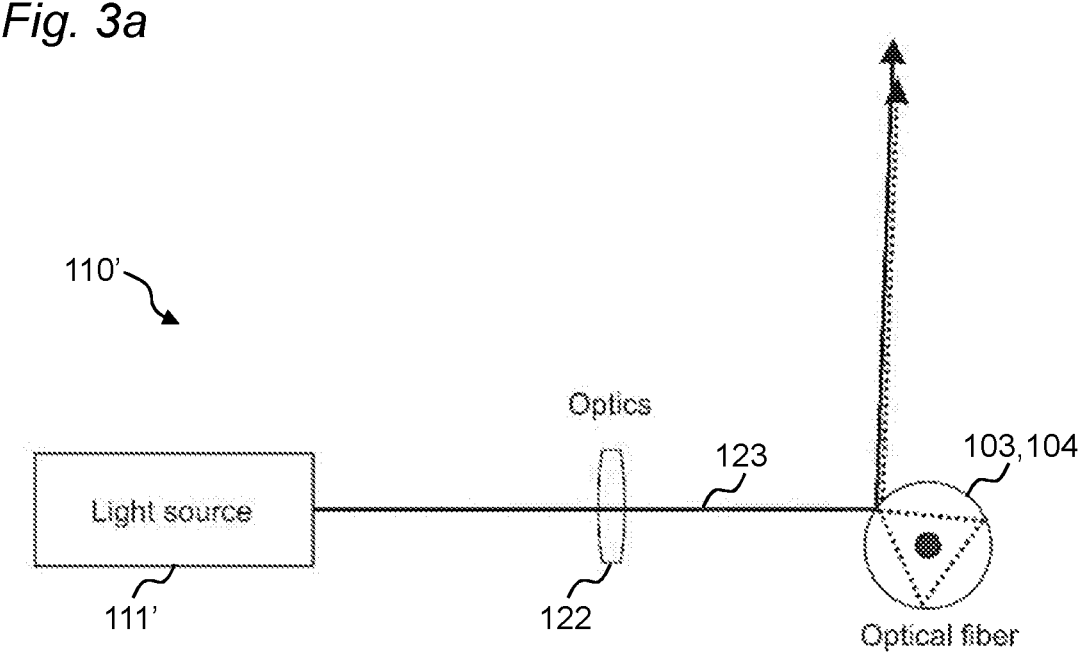
FIG. 3a is a schematic view of a Mach Zehnder type microcavity interferometer.
Figure 3B:
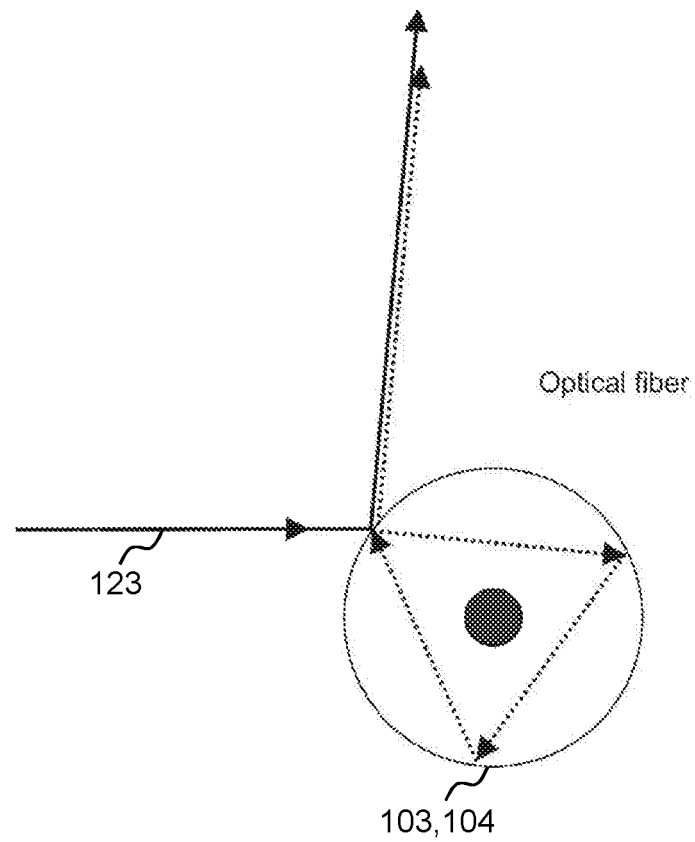
FIG. 3b is a schematic view of the optical path in a Mach Zehnder type microcavity interferometer.

The temperature of the fiber ends is determined according to the method by measuring changes in an optical path length, as shown in FIGS. 2b and 3b, in an optical fiber due to temperature dependent properties of the optical fiber (103,104).

Figure 4:
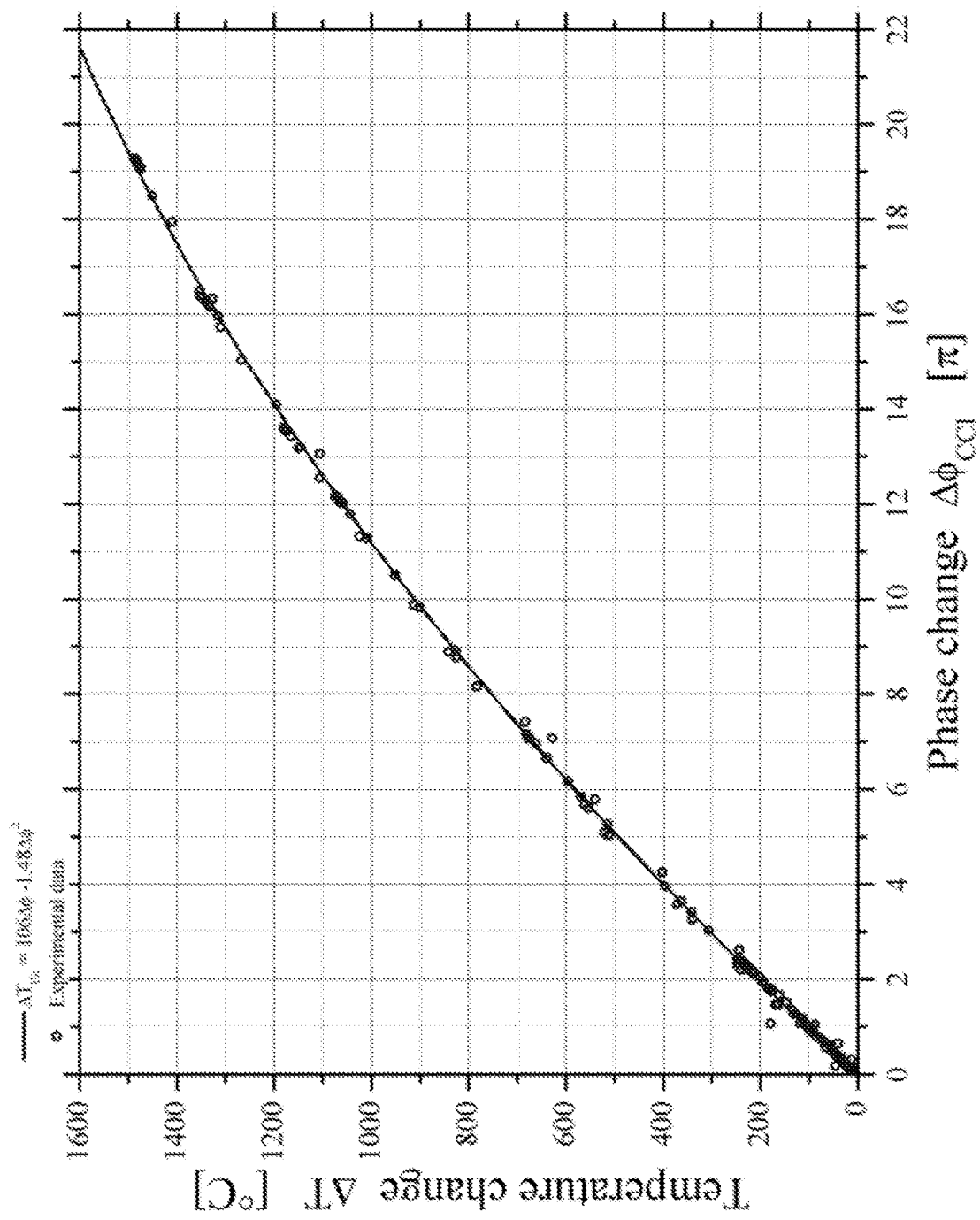
FIG. 4 is a calibration curve showing change in measured phase change of an SM optical fiber with change in temperature $\Delta T$ 0 to ~1500° C., using a HeNe laser.

The temperature dependent properties of the optical fiber are converted into temperature values using a calibration curve for the specific material of the optical fiber. An example of a calibration curve for an SM fiber, using a HeNe laser, is shown in FIG. 4.

Figure 5:
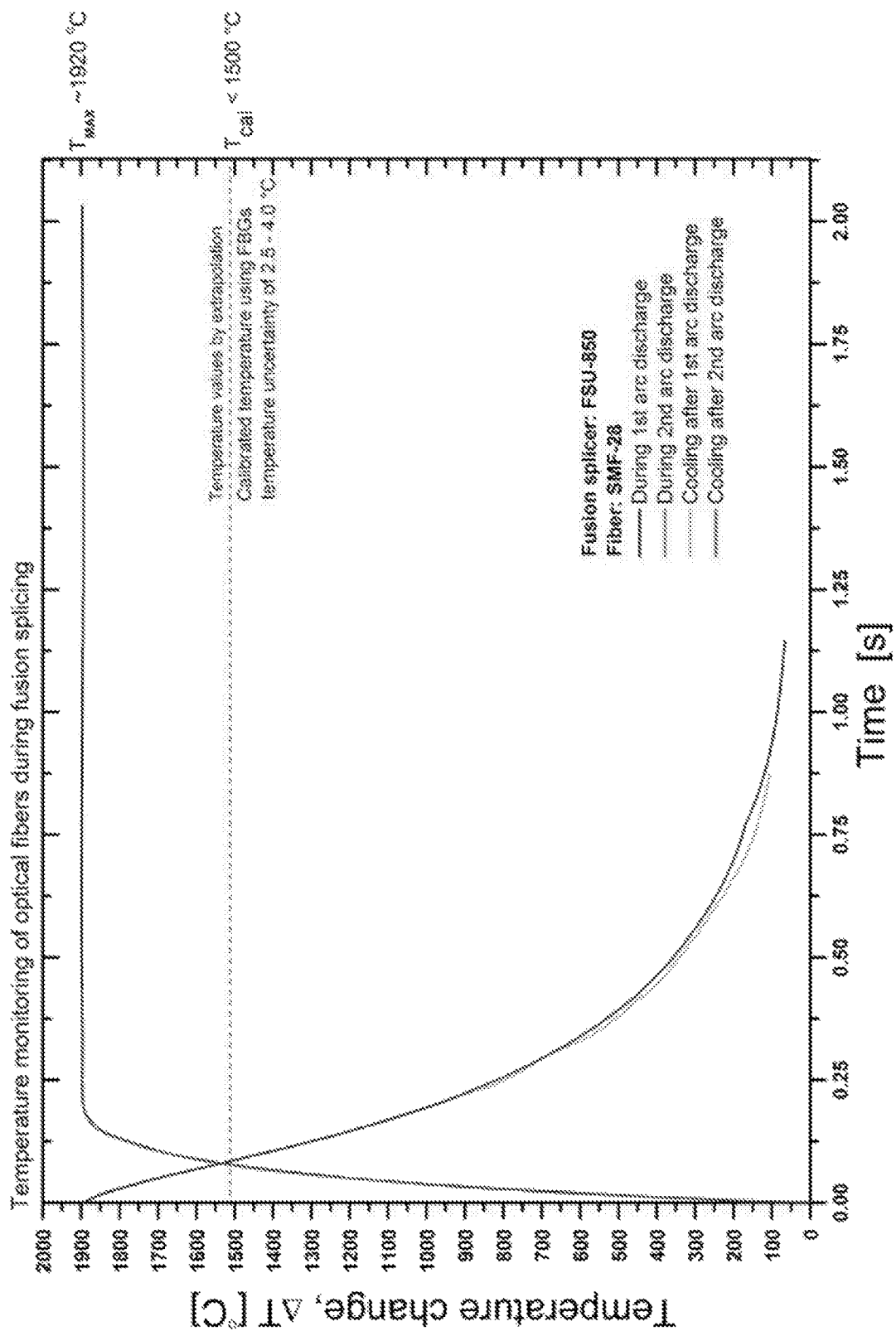
FIG. 5 is a diagram showing the temperature of an optical fiber measured during and directly after fusion splicing using the inventive method.

The signal from the detector (112,112') is analyzed by the data processing and temperature analysis feedback loop (117) of the control unit (116), and the temperature of the fiber ends is determined. An example of a temperature monitoring during fiber splicing is shown in FIG. 5.

The optical fiber material should be optically transparent/semitransparent in at least one wavelength region. The wavelength region should be transparent or semitransparent within the temperature range of interest. The fiber cross section should be circular symmetric, i.e in the form of a cylinder. When heated, the optical fiber changes in dimension and refractive index due to thermal expansion and the thermo-optical properties of the material.

Generally, the microcavity interferometer consists of the optical microcavity (i.e. the optical fiber being spliced), a light source (e.g. a laser), optical components (e.g. mirrors, lenses, beam splitters and polarization optics), detector components (e.g. homodyne detection, heterodyne detection, spectral detection, or imaging/fringe analysis), and equipment for processing, presenting, and/or storing the data/results obtained from the measurement.

The light source should have a wavelength/wavelengths overlapping with wavelength region of transparency/semitransparency of the optical fiber, and a coherence length of the order of, or greater than the diameter of the optical fiber.

FIG. 2a is a schematic representation of a Fabry Perot type microcavity interferometer (FP interferometer). The FP interferometer (110) consists of a light source (111) in the form of a laser, a beam splitter (119), and a focusing lens (120) for focusing the beam (121) on the optical fiber microcavity (103,104).

FIG. 3a is a schematic representation of a Mach Zehnder type microcavity interferometer (MZ interferometer). The MZ interferometer (110') consists of a light source (111') in the form of a laser and a focusing lens (122) for focusing the beam (123) on the optical fiber microcavity (103,104).

The optical interferometers of the invention is based on a micro-cavity design having circular symmetry. Impinging light will be partially reflected and scattered at the interfaces of the micro-cavity due to changes of the refractive index between the ambient air and the micro-cavity, i.e. Fresnel reflections. By using a beam of light positioned in such a way that different Debye series modes of scattering are co-aligned and overlap, the modes can be made to interfere at a position outside the cavity, as shown in FIG. 2b for a FP interferometer and in FIG. 3b for an MZ interferometer.

The recombined beams will interfere constructively or destructively depending on the phase difference between the two paths of the interferometer. The phase difference is given by the difference in optical path length, OPL=(length)×(refractive index), between the two paths. As the diameter and refractive index is temperature dependent and characterized by the thermal expansion coefficient and thermo-optic coefficient, respectively, a change in temperature will change the conditions of interference and signal detected.

Using a collimated beam with a diameter equal or greater than the micro-cavity, resulting in interference among all different scattering modes, making the interpretation more difficult. To simplify one can use a focused beam, limiting the angular distribution of scattering modes, which enables a higher degree of selection of the different scattering modes, approaching that of the ray tracing in FIGS. 2a and 2b.

Using a focused beam also ensures that the phase front of the light is parallel with the surface of reflection. This is true specifically for the FP interferometer (FIG. 2a). Using a focused beam with the focus placed at/near the center of the optical fiber, the phase front of the optical beam becomes parallel to the surface of the cylinder/sphere as in the case of a traditional Fabry-Perot interferometer.

In the MZ interferometer, incoming light is partially reflected at the surface (surface reflection), while part of the light is transmitted/refracted and can be reflected further within the cavity before exiting the cavity, as shown in FIG. 2b. For a specific position and angle of the incoming beam, the surface reflection and the 3rd order refracting beam are co-aligned and can be made to interfere. For silica glass the angle is ~94 deg.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

The invention will now be described more in detail by way of the following non-limiting examples.

Example 1

Temperature as a Function of Phase

FIG. 4 shows the measured temperature as a function of phase when an SM fiber with a diameter of 125 µm was heated using a carbon-dioxide laser.

The measurement was performed by (i) measuring the change in phase by interferometry, using the optical fiber as the optical microcavity, and (ii) simultaneously measuring the temperature of the optical fiber, at the same position, using a previously calibrated high-temperature stable fiber Bragg grating as described in U.S. Pat. No. 6,334,018B1 (Optical material having periodically varying refractive index and method of making). Localized heating of the grating and interferometer optical microcavity was performed by laser irradiation using a carbon-dioxide laser operating at a wavelength of 10.6 µm.

To measure the change in phase (i) an optical setup similar to that shown in FIG. 2a was used. The light source was a Helium-Neon (HeNe) laser operating at 632 nm. Phase extraction was performed using fringe counting with signal detection comprised of recording the quadrature signals from the interferometer optical microcavity followed by phase unwrapping.

To correlate the phase change to a change in temperature, a high temperature stable optical fiber Bragg grating was positioned at the same location as the interferometer optical microcavity. The fiber Bragg grating was 1 mm long with a Bragg wavelength at room temperature of 1542 nm. The peak wavelength of the grating was monitored in reflection using a white light source, an optical fiber circulator and an optical spectrum analyzer. Heating was performed by irradiating the fiber for a duration of two seconds. The data points in FIG. 4 include heating and cooling dynamics of six separate measurements using different power levels.

Example 2

Temperature Measurement of Fiber During Fusion Splicing

FIG. 5 is a diagram showing the measured temperature changes in an SM optical fiber during and directly after heating of the optical fiber using the electric arc discharge from an Ericsson FSU-850 fusion splicer. The measurement was performed using standard parameter settings for SM optical fiber splicing.

Recording of changes in phase during heating was performed using a similar setup as shown in FIG. 2a, and as described in Example 1, with the interferometer optical microcavity positioned at the center of the electric arc discharge region. After recording the phase dynamics during heating, the measured phase changes were converted to corresponding temperature changes using the temperature-phase relation shown in FIG. 4, using extrapolation for temperatures in excess of 1500° C. The measurements shown in FIG. 5 include two consecutive measurements, with the corresponding cooling dynamics rescaled to start at time zero.

The invention claimed is:

1. A method for measuring temperature of optical fibers during fusion splicing or thermal processing, said method comprising:
    a) measuring, using an interferometric method, a change in an optical path length in an optical fiber due to temperature dependent properties of the optical fiber during fusion splicing or thermal processing;
    b) determining the temperature of the optical fiber based on the measured changes in the optical path length; and
    c) using the temperature determined in step b) as feedback during splicing to enable controllable temperature.

2. The method according to claim 1, wherein said optical fiber is made of a material selected from the group consisting of silica-based glass, telluride glass, chalcogenide glass, fluoride glass, sapphire crystal, quartz crystal, and crystalline silicon.

3. The method according to claim 1, wherein said temperature dependent properties of the optical fiber are selected from the group consisting of thermal expansion and refractive index.

4. The method according to claim 1, wherein the temperature measured is in a range of from 100° C. to 3000° C.

5. The method according to claim 1, wherein said interferometric method comprises measuring the change in an optical path length using a Fabry-Perot or Mach-Zehnder type interferometer.

6. The method according to claim 1, wherein the method further comprises the step:
    d) analyzing the optical fiber after fusion splicing using an interferometric method to determine quality of the splice through detection of variations in diameter or refractive index of the optical fiber.

7. The method according to claim 1, wherein the temperature measurement is not sensitive to changes in temperature and humidity in an atmosphere surrounding the optical fiber.

8. A fusion splicing apparatus for fusing or welding optical fibers together, said apparatus comprising means for measuring temperature of the optical fibers during fusion splicing or thermal processing,
  wherein said means comprise an optical microcavity interferometer configured to measure a change in an optical path length in an optical microcavity due to temperature dependent properties of the optical microcavity,
  wherein said optical microcavity interferometer is arranged to use an optical fiber being subjected to fusion splicing or thermal processing in the fusion splicing apparatus as the optical microcavity, and
  wherein the apparatus is configured to use the measured temperature as feedback during splicing to enable controllable temperature.

9. The fusion splicing apparatus according to claim 8, wherein the optical microcavity interferometer is a Fabry-Perot or Mach-Zehnder type microcavity interferometer.

10. The method according to claim 2, wherein said temperature dependent properties of the optical fiber are selected from the group consisting of thermal expansion and refractive index.

11. The method according to claim 1, wherein the temperature measured is in a range of from 1000° C. to 3000° C.

12. The method according to claim 2, wherein said interferometric method comprises measuring the change in an optical path length using a Fabry-Perot or Mach-Zehnder type interferometer.

13. The method according to claim 3, wherein said interferometric method comprises measuring the change in an optical path length using a Fabry-Perot or Mach-Zehnder type interferometer.

14. The method according to claim 6, wherein said optical fiber is made of a material selected from the group consisting of silica-based glass, telluride glass, chalcogenide glass, fluoride glass, sapphire crystal, quartz crystal, and crystalline silicon; and
  wherein the temperature measurement is not sensitive to changes in temperature and humidity in an atmosphere surrounding the optical fiber.

15. The method according to claim 14, wherein said interferometric method comprises measuring the change in an optical path length using a Fabry-Perot or Mach-Zehnder type interferometer; and
  wherein the temperature measured is in a range of from 100° C. to 3000° C.

* * * * *